United States Patent [19]
Echigo

[11] Patent Number: 5,739,973
[45] Date of Patent: Apr. 14, 1998

[54] APPARATUS FOR RECORDING A MIXED VIDEO AND TRACKING SIGNAL ON A MAGNETIC RECORDING MEDIUM

[75] Inventor: Noriyasu Echigo, Ashiya, Japan

[73] Assignee: Matsushita Electric Industrial Co., Ltd., Osaka-fu, Japan

[21] Appl. No.: 724,147

[22] Filed: Sep. 30, 1996

Related U.S. Application Data

[63] Continuation of Ser. No. 317,546, Oct. 4, 1994, abandoned.

[30] Foreign Application Priority Data

May 10, 1993 [JP] Japan ................. 5-249013

[51] Int. Cl.$^6$ .................................. G11B 5/58
[52] U.S. Cl. ..................... 360/77.15; 360/77.14
[58] Field of Search .................. 360/10.2, 10.3, 360/13, 77.15, 77.14, 64, 77.13; 386/78, 79

[56] References Cited

U.S. PATENT DOCUMENTS

| | | | |
|---|---|---|---|
| 4,816,930 | 3/1989 | Kuho et al. | 360/10.2 |
| 5,018,036 | 5/1991 | Yamashita | 360/64 X |
| 5,084,786 | 1/1992 | Konno et al. | 360/77.15 X |
| 5,103,355 | 4/1992 | Steele | 360/10.2 X |
| 5,126,892 | 6/1992 | Nagasawa et al. | 360/10.2 X |
| 5,138,499 | 8/1992 | Tamegai | 360/77.13 X |
| 5,210,663 | 5/1993 | Nakase et al. | 360/10.2 X |
| 5,327,295 | 7/1994 | Togashi et al. | 360/13 |
| 5,388,007 | 2/1995 | Sekimoto | 360/13 |
| 5,402,281 | 3/1995 | Yanagihara et al. | 360/77.15 |
| 5,428,486 | 6/1995 | Nagase | 360/64 |
| 5,510,938 | 4/1996 | Sakakibara | 360/77.14 |

FOREIGN PATENT DOCUMENTS

| | | |
|---|---|---|
| 0213937 | 3/1987 | European Pat. Off. . |
| 0533462 | 3/1993 | European Pat. Off. . |
| 0094207 | 11/1993 | European Pat. Off. . |

OTHER PUBLICATIONS

Patent Abstract of Japan, vol. 16 No. 558, Nov. 27, 1992, "Magnetic Recording and Reproducing Device", Kaniwa et al.
European Search Report and Annex.
Mee et al., *Magnetic Recording, vol. III: Video, Audio, and Instrumentation Recording*, pp. 24–54 (1988).

Primary Examiner—AristoTelis M. Psitos
Assistant Examiner—Larry T. Cullen
Attorney, Agent, or Firm—Greenblum & Bernstein P.L.C.

[57] ABSTRACT

A helical scanning magnetic recording apparatus utilizing Azimuth recording technology includes a reading head and a writing head which are arranged with a predetermined dimensional relationship. When the recording to a recording tape, the reading head and the writing head simultaneously record a first track and a second track beside the first track. Since the writing head is located on the upper stream side than the reading head, the writing head can be tracked on the next track position when the, reading head is placed over the first and second tracks such that the reading head reproduces the first and second tracking signals having the same amplitude.

4 Claims, 13 Drawing Sheets

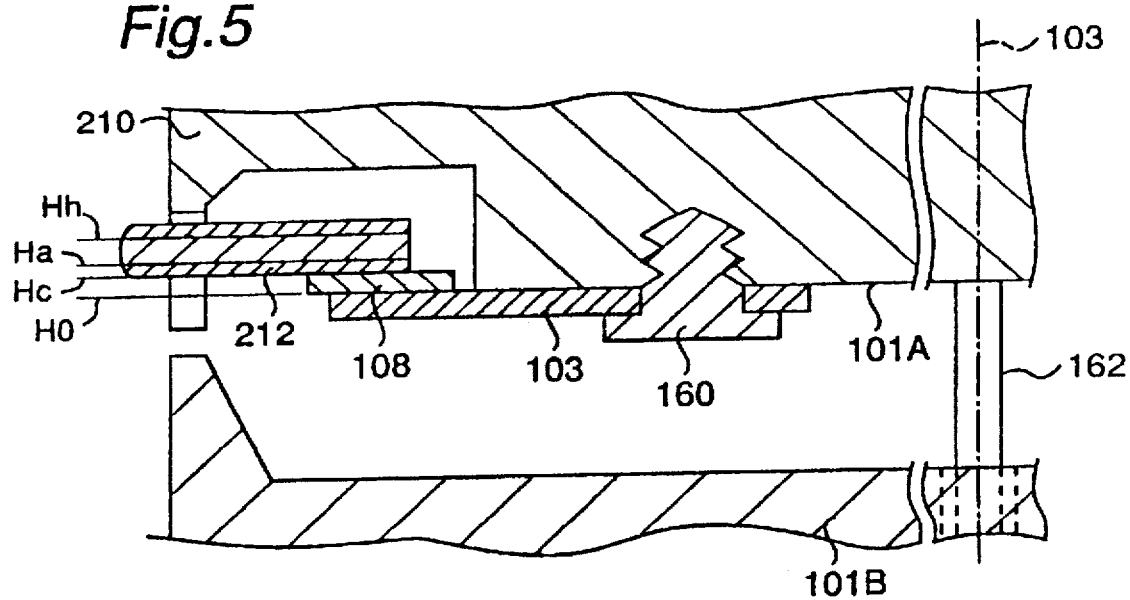
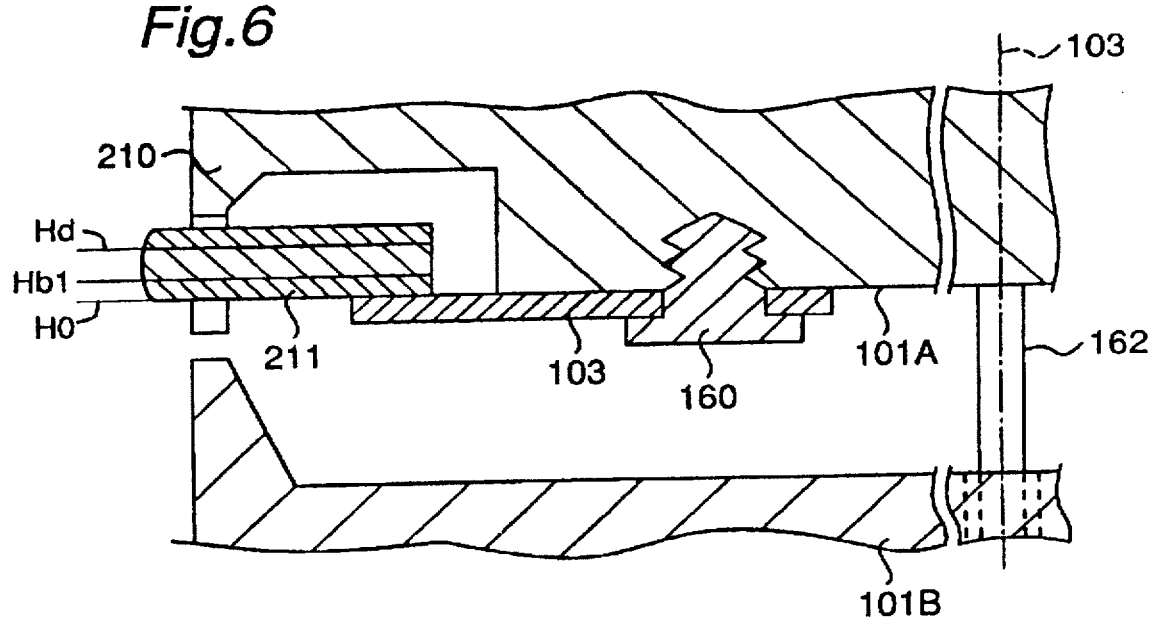

APPARATUS FOR RECORDING A MIXED VIDEO AND TRACKING SIGNAL ON A MAGNETIC RECORDING MEDIUM

This application is a continuation of application Ser. No. 08/317,546, filed Oct. 4, 1994, now abandoned.

BACKGROUND OF THE INVENTION

1. Field of the Invention

The present invention relates to a magnetic recording apparatus such as a video tape recorder which magnetically records a signal on a recording medium and reproduces the recorded signal from the medium utilizing a helical scanning method and, more particularly, to a magnetic recording apparatus suitable for a high-density recording and reproducing with a precise tracking.

2. Description of the Prior Art

In a magnetic recording apparatus such as a video tape recorder (VTR) or a video cassette tape recorder (VCR) which records and reproduces the signals on and from the tape by utilizing a helical-scanning technology, the recording density becomes higher year by year. Nowadays, the high-density recording such that one bit is recorded in the recording area of 1 μm² is developed in various fields. Under this density, the signal is recorded and reproduced with the minimum recording wave length of around 0.4 μm at a track pitch of around 5 μm.

To increase the recording density, the signal is recorded on the tape such that no guard band, which does not contribute to the recording and reproducing signal, is formed between adjacent tracks. The signal is recorded on thus formed tracks by the magnetic head having a magnetic gap slanted to the tracing direction, this slanted angle is referred to as "Azimuth angle". Adjacent tracks are recorded to have different "Azimuth angles" so as to keep from the noise signal from the adjacent track.

In FIG. 21, an example of conventional two-head helical-scan video recorder is shown. A recording tape 110 is physically wrapped around a rotating-head drum 101A in a helical-shaped tape path. During the recording operation, the rotating head drum 101A having two magnetic heads 102A and 102B located on the opposite position is rotated, on a fixed lower head drum 101B, in a direction indicated by an arrow Dc. The recording tape 110 is fed in a direction indicated by an arrow Dt.

In FIG. 22, a portion of tape which is azimuth recorded by the two magnetic heads 102A and 102B, viewed from the head drum side, is shown. Tracks Tr1, Tr2, Tr3, Tr4, and Tr5 are consecutively recorded without a guard band therebetween on the tape 110 diagonally, wherein the first head 102A records the track Tr4, and the second head 102B successively records the track Tr5 such that a portion of the track Tr4 is overwritten by the track Tr5. As a result, the track Tr4 having the full track pitch is formed on the tape 110.

Generally, the heads have a track width greater than the track pitch so as to suppress the variations of the playback signal even when the tracking becomes unstable during the reproducing operation. However, too wide a track width of the head compared with the track pitch causes the noise element in the reproduced signal to increase. Furthermore, during insertion recording, meaning that the existing track is overwritten, the inserted track may be too narrow relative to the adjacent tracks. In consideration of the above, the magnetic heads as 1.2 to 1.5 times as wide as the track pitch are widely employed.

To precisely track the track recorded at a narrow track pitch, recently, the tracking signal is recorded together with the information signal, or the information signal is modulated to generate the tracking signal. During playback, the tracking is performed based on the tracking signals reproduced from the tracks the tracks adjacent the playback track.

To enhance the tracking precision, a dynamic tracking method wherein the tip of magnetic head is set on a movable support is employed. The position of movable support is adjusted according to the tracking signals generated by the adjacent tracks.

A video cassette recorder (VCR) having two recording modes is in wide use. One is a standard play mode, hereinafter referred to as "SP" mode, wherein the signal is recorded at a standard track pitch. Another is a long play mode, hereinafter referred to as "LP" mode, wherein the signal is recorded at around a half of the standard track pitch. The VCR is often used to additionally record the information to certain tracks of the already recorded tape, which will be referred to as "insertion recording mode" and the target track for the insertion recording is referred to as "insertion track".

In the case that a single of magnetic head is used for recording and reproducing, a plural tracks adjacent the inserting track is destructively overwritten when the video tape recorded at the LP mode is subject to the insertion recording, because the magnetic head for the SP mode should have a track width about twice as wide as that for the LP mode. To avoid such a destructive overwriting of the adjacent tracks, two magnetic heads provided specially for SP mode and LP mode, respectively, are employed for the VCR.

However, the conventional video recorder described in the above is subject to the following problems essential, and has no effective measure to solve them.

First, the track width of the track recorded on the tape varies along its course. Especially, when the width of tracks recorded at LP mode varies, the signal-to-noise ratio (S/N ratio) at the track having reduced width becomes lower than the minimum allowable value.

Second, when the insertion recording is performed to the already recorded track, the tracks adjacent the insertion track are partially overwritten by the insertion track to narrow the adjacent tracks resident on the tape, causing the first case of problem.

Third, when the insertion recording is performed to the video tape which is recorded by another VCR, the difference in the curvature of track formed by the two VCRs also causes the adjacent tracks to be overwritten by the superimposition of track curvature in addition to the second problem above.

Fourth, when the S/N ratio becomes lower due to the high-density recording, the error correction rate also reduced.

Fifth, it is impossible to enhance the tracking precision for the tracks at narrower pitch.

For example, when the record and playback is performed with a pair of magnetic heads 102A and 102B of FIG. 21, each head is located on the circumferential surface of rotating drum 100 to oppose to each other with respect to a rotating axis 103. However, dimensional errors in the machining of magnetic heads 102A and 102B and the installation thereof to the rotating drum 100, and the precession of the drum axis 103 is inevitable. As a result, two heads 102A and 102B trace tracks having different forms, as shown in FIG. 23.

In FIG. 23, the head 102B shows a straight trace but the head 102A shows a curved trace. As a result, the tracks Tr1 and Tr3 have the width greater than the predetermined track width. On the contrary, the tracks Tr2 and Tr4 have the width smaller than the predetermined track width. Thus, when the each of magnetic heads draws the different shaped trace, the signal which is azimuth recorded in the track drawing by such heads varies along its course. Since the reduction of track width expressly causes the reduction of S/N ratio, it should be suppressed as possible.

Since the track pitch for the LP mode is smaller than that for the SP mode, the S/N ratio under the LP mode is smaller than that under the SP according to the difference of track pitches thereof. Therefore, when the S/N ratio reduces due to the reduced track width, the reproduced signal can not obtain the minimum level of the S/N ratio allowable for the VCR system under the LP mode.

With reference to FIG. 24, the problem under the insertion recording mode is described. The magnetic head is usually designed to have a track width as 1.2 to 1.5 times as wide the track pitch for the insertion recording mode. The magnetic head 103 has a track width one and half times as wide as the track pitch. On the tape 110, three tracks Tr1, Tr2, and Tr3 are already recorded, and now the middle track Tr2 is subject to the insertion recording. If the head 103 is ideally tracked on the insertion track Tr2, the portions of adjacent tracks Tr1 and Tr3 are overwritten by the head 103 with the inserted track Tr2. Then, tracks Tr1 and Tr3 reduce the widths thereof, and the S/N ratio of the playback signal therefrom reduces according to the reduced width compared with before the insertion recording.

The ratio of reduction of the S/N ratio of playback signal after the insertion recording is the same both in the LP mode and SP mode when the ratio of track width of magnetic head to the track pitch is the same in the both modes. However, the S/N ratio of the playback signal under the LP mode from the original track before insertion recording is smaller than that under the SP mode. The S/N ratio becomes lower than the minimum allowable level due the playback signal reduced by the insertion recording.

The second problem described with reference to FIG. 23 is caused by the differences of the tracing shape drawn by two magnetic heads 102A and 102B mounted on the rotating drum 101A, and appears different result peculiar to the VCR used for recording. Therefore, when the video tape previously recorded by a VCR is insertion recorded by another VCR, the adjacent tracks to the insertion track are further narrowed by the overwriting of the insertion track in addition to the track width reduction described above. As a result, the level of playback signal from the tracks adjacent to the insertion track further decreases, resulting in the further reduction of the S/N ratio.

Originally, the playback under the LP mode is performed with a lower S/N ratio, where the Viterbi demodulation method, for example, has been used to reduce the signal error rate. But, it is very difficult to achieve the desired error rate with respect to the narrowed tracks at a pitch of 5 μm.

Furthermore, there are no effective reproducing and demodulation measures for the case that S/N ratio reduces due to the variation of track width caused by the recording or the insertion recording is proposed. Similarly, it is very difficult to precisely track the magnetic head on one of the narrow recorded tracks.

SUMMARY OF THE INVENTION

The present invention has been developed with a view to substantially solving the above described disadvantages and has for its essential object to provide an improved magnetic recording apparatus.

In order to achieve the aforementioned objective, a magnetic recording apparatus for magnetically recording a signal on a recording tape comprises a first tracking signal generating means for generating a first signal having a first predetermined frequency; a first head means for writing said first signal on said recording tape to form a first track; a second tracking signal generating means for generating a second signal having a second predetermined frequency; a second head means for writing said second signal on said recording tape to form a second track; and a tracking means for tracking said first head means over said first and second tracks so that said first head means reproduces the said first and second signals having the same amplitude, respectively, therefrom.

BRIEF DESCRIPTION OF THE DRAWING

These and other objects and features of the present invention will become clear from the following description taken in conjunction with the preferred embodiments thereof with reference to the accompanying drawings throughout which like parts are designated by like reference numerals, and in which:

FIG. 5 is a cross-sectional view taken along a line V—V shown in FIG. 3;

FIG. 6 is a cross-sectional view taken along a line VI—VI shown in FIG. 3;

DETAILED DESCRIPTION OF THE PREFERRED EMBODIMENTS

First Embodiment

Figure 2:
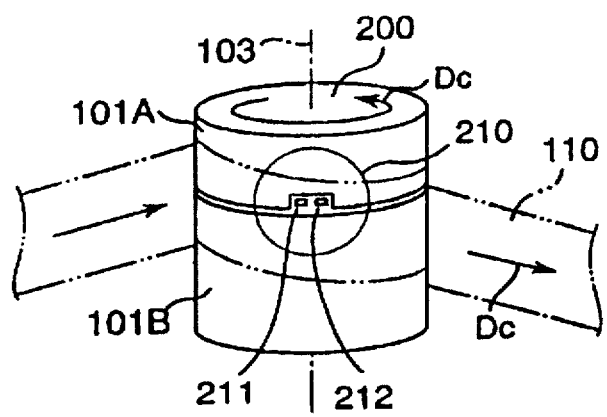
FIG. 2 is a perspective view showing a rotating head drum of the magnetic recording apparatus of FIG. 1.

Referring to FIG. 2, a head drum unit used in a magnetic recording apparatus according to a first embodiment of the present invention is shown. A head drum unit 200 is comprised of an upper rotating head drum 101A and a lower fixed head drum 101B. The upper head drum 101A has a magnetic head unit 210 incorporated in the circumferential surface thereof. The magnetic head unit 210 includes a reading head 211 and a writing head 212 arranged with a predetermined dimensional relationship, which will be described later with reference to FIGS. 4 and 5. A recording tape 110 indicated by a phantom line is physically wrapped around the rotating head drum 101A in a helical-shaped tape path.

Figure 3:
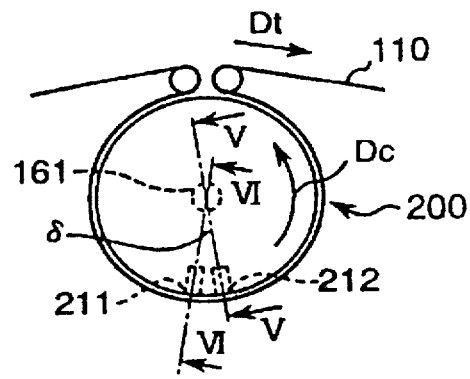
FIG. 3 is a top view of the rotating head drum of FIG. 2.

Referring to FIG. 3, a top view of the head drum unit 200 of FIG. 2 is shown, where the recording tape 110 is indicated by a solid line as separated from the circumference of the drum unit 200 for the sake of better recognition. During the recording operation, the rotating head drum 101A is rotated in a direction indicated by an arrow Dc with respect to an axis 103 thereof, and the recording tape 110 is fed in an arrow direction Dt, as best shown in FIG 2. By one rotation of the drum 101A, the heads 211 and 212 can writes and read one track, respectively. This movement of the head unit 200 or the tape 110 for tracing one track is referred to as a "reading/writing path".

Figure 4:
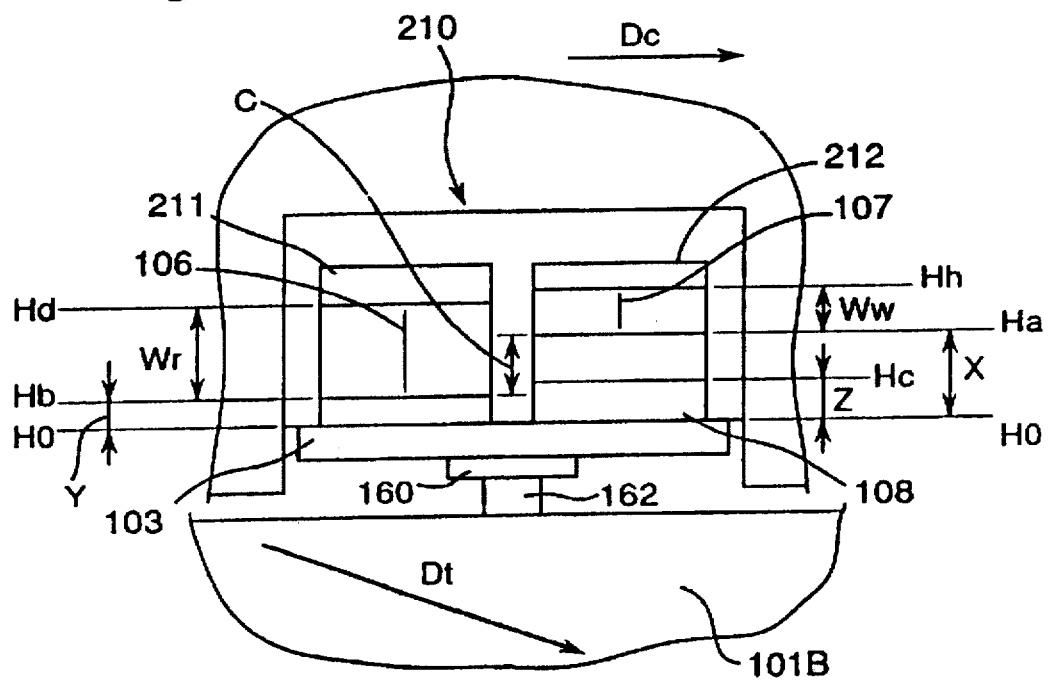
FIG. 4 is a front view showing, on an enlarged scale, a portion of FIG. 2 which is enclosed by the circle.

Referring to FIG. 4, a front view of the head unit 210 is shown. The reading head 211 and writing head 212 have magnetic gaps 106 and 107, respectively, vertical extending on the surface, and are arranged on a support plate 103 such that the writing head 212 is located on the upper stream side than the reading head 211 with respect to the rotating direction Dc. In other words, the radii passing through the magnetic gaps 106 and 107 make an angle δ therebetween, as best shown in FIG. 3. The writing head 212 precedes to the reading head 211 for the angle δ with respect to the rotating direction Dc. A spacer 108 is placed between the writing head 212 and the support plate 103 so as to place the both heads 211 and 212 at a predetermined position with respect to the recording tape 110. In other Words, the reading head 211 is tracked to scan the boundary between two tracks formed on the tape 110; the first track is formed preceding to the track which the writing head 212 is now recording, and the second track is formed preceding the first track.

Referring to FIG. 5, a cross-sectional view of the writing head 212 is shown. On the upper surface of support plate 103, the spacer 108 having a predetermined thickness suitable is placed, and the writing head 212 is placed on the upper surface of the spacer 108, which are firmly fixed to each other by a fixing measure such as an adhesive agent. The thickness of adhesive agent between adhered components 103, 108, and 212 is small enough to neglect. Thus formed writing head assembly is firmly fixed to the lower surface of upper head drum by a fixing member 160 such as a bolt. It is to be noted that the outer surface of the head 212 protrudes from the circumferential surface of the drum 101A by a predetermined, amount so that the head 212 can slideably contact with the tape surface at a stable condition. The upper head drum 101A is rotated by a shaft 162 connected to a driving motor (not shown) provided below the lower head drum 102A.

Referring to FIG. 6, a cross-sectional view of the reading head 211, similar to that of FIG. 5, is shown. However, the reading head 22 is directly adhered to the support plate 103 without the spacer 108 therebetween.

Referring back to FIG. 4, the dimensional relationship between both heads 211 and 212 is shown. The top surface of support plate 103 is used as a reference plane for defining the vertical position of heads 211 and 212, and is indicated as a bottom level H0. Levels Hb, Hc, Ha, Hd, and Hh indicate heights from the bottom level H0, respectively, wherein a relationship of Hb<Hc<Ha<Hd<Hh are available therebetween. Levels Hb, Hc, Ha, Hd, and Hh also indicate the side edges of the heads 211 and 212 which correspond to each level. The distance between level Hb and Hd and the distance between levels Ha and Hh indicate the track width Wr of the reading head 211 and the track width Ww of the writing head 212, respectively. The distance C between levels Ha and Hb represents the difference of the height of tracks which will be formed by the heads 211 and 212, and is referred to as a "relative track height".

Hereinbelow, the method to adjust this "relative track height C" is described. When the relative tracking height C is zero; a distance X between the levels Ha and H0 is equal to a distance Y between the levels Hb and H0; and the recording tape 110 is not driven, the intersection of the magnetic gap 107 and the side edge Ha scans the tape 110 on the same position where the intersection of the magnetic gap 106 and the side edge Hb. In case that the recording tape 110 is fed in the arrow direction Dt at a predetermined speed TS, each of intersections above is shifted off by Δ in the direction with respect to the track due to the angle δ. The shift amount Δ is equal to the vertical element of the distance the recording tape 110 moves toward the heads for a period from the time when the magnetic gap 107 of the writing head 212 magnetically recorded at a certain portion of the tape 110 to the time the magnetic gap 106 of the reading head 211 passes over this portion. Since this period is expressed as "δ/360×1/R", the shifted mount Δ can be expressed as $$\Delta = (\delta \times TS \times \sin\theta)/(R \times 360) \quad (1),$$

wherein TS represents the feeding speed (m/s) of the tape 110; R represents the number of rotation (rpm); δ represents the angle (degree); and θ represents the angle of writing head 212 with respect to the tape feeding direction Dt.

Since the tape 110 is fed in the track direction by one track pitch TP while the upper drum 101A makes one rotation, sinθ which is an element of the tape feeding speed TS with respect to the track direction is expressed as $$\sin\theta = R \times TP/TS \quad (2).$$

Therefore, from equations (1) and (2), the following equation is obtained.

$$\Delta = \delta \times TP/360 \quad (3).$$

The case that no relative track height C is provided is as described above. However, when the heads 212 and 211 are arranged to have the relative track height C (X−Y), as shown in FIG. 4, the intersection of the magnetic gap 106 ad the side edge Hb of reading head 22 scans the position which is further shifted off to the track direction due to the amount X−Y.

Figure 7:
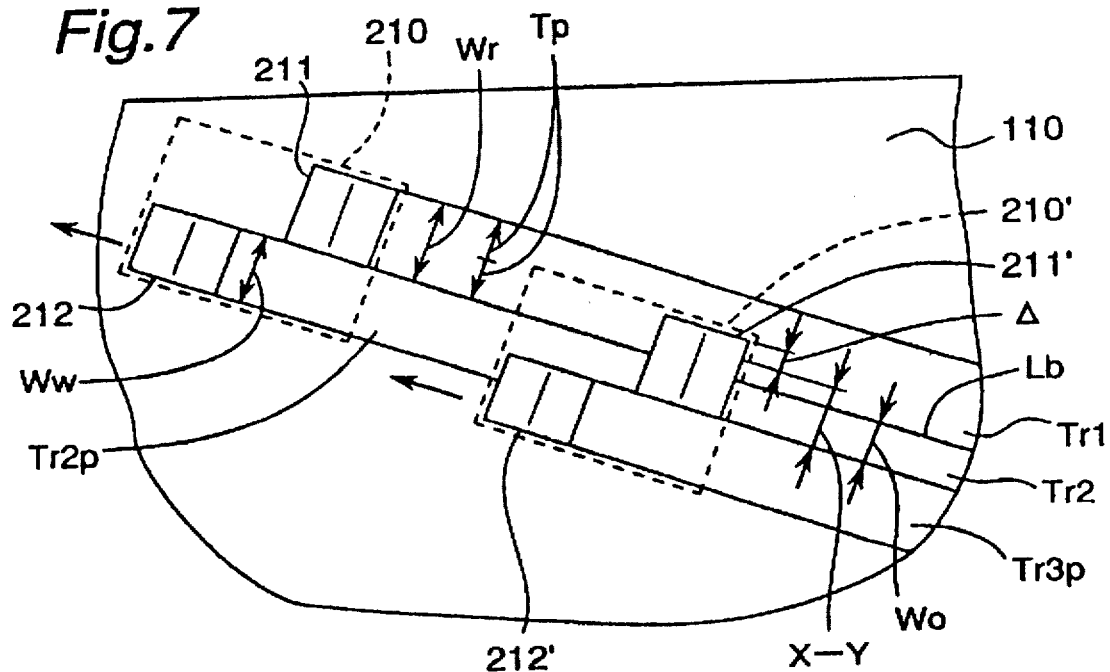
FIG. 7 is a view showing tracks magnetically recorded on the recording tape by the magnetic recording apparatus of FIG. 1.

As described previously, the heads 212 and 211 are positioned such that the reading head 211 scans the boundary between the second track preceding to the first track which the writing head 212 currently records by placing the spacer 108 between the head 212 and the support 108 to adjust the relative track height C properly. This means that a sum of the shifted amount Δ and the relative track height C is equal to a sum of the track pitch TP and a half of the track width Wr of the reading head 211, as best shown in FIG. 7 wherein the track pitch Tp is equal to the distance W. Since it is expressed that Δ+X−Y=TP+Wr/2, and that Tp=WO, from the equation (3), the following equation is obtained.

$$C = (2 - \delta/360) \times TP \quad (4).$$

To adjust the relative track height C as the equation (4) defines, the distance X between the levels Ha and HO and the distance Y between the levels Hb and HO are measured. According to the measure distances X and Y, the thickness Z of spacer 108 is prepared to satisfy the following equation.

$$Z = C + Y - X \quad (5).$$

Figure 1:
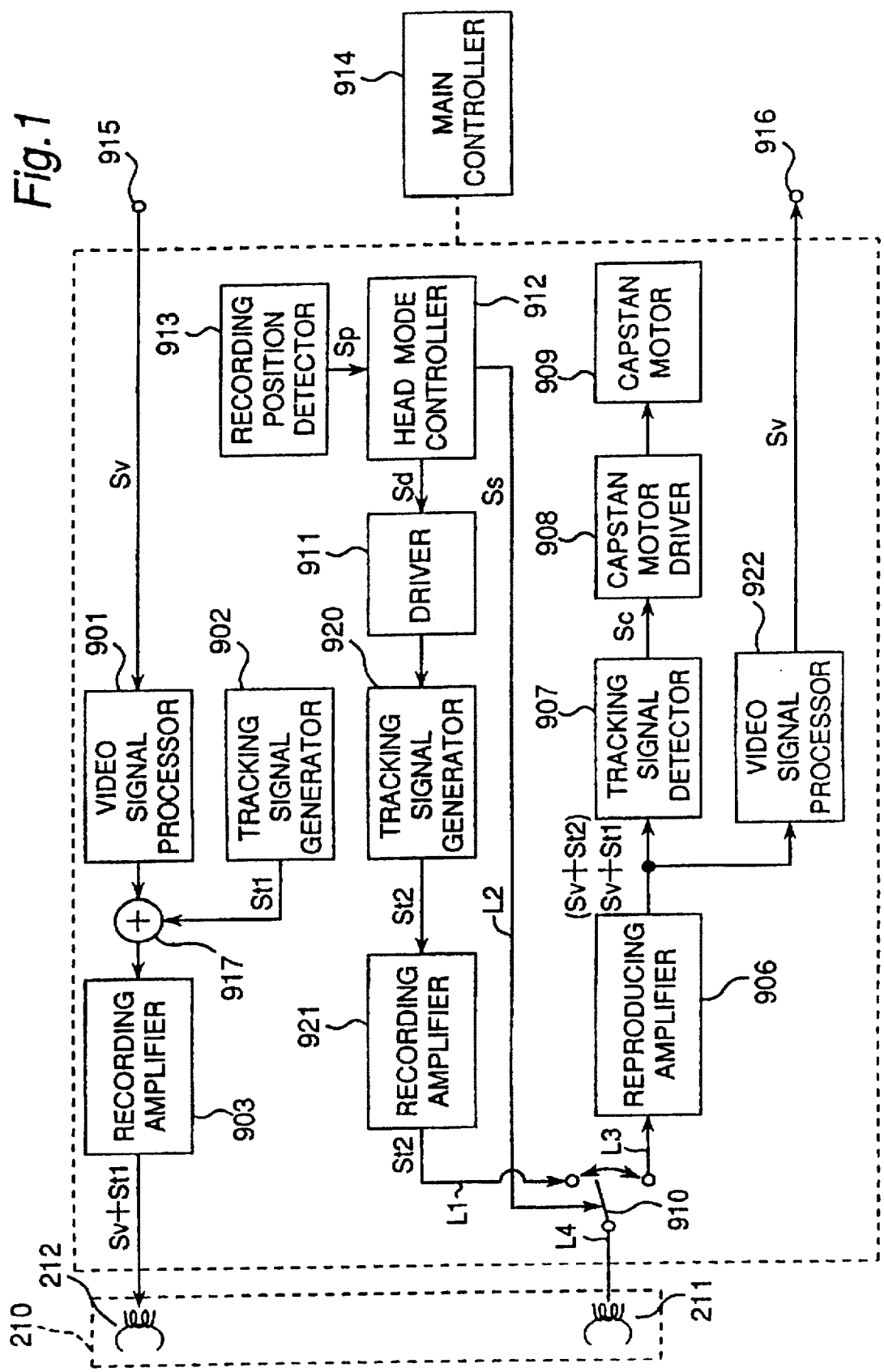
FIG. 1 is a block diagram showing a magnetic recording apparatus a first embodiment of the present invention is incorporated.

With reference to FIG. 1, the construction of magnetic recording apparatus wherein thus arranged head unit 210 is incorporated is described. The magnetic recording apparatus includes an input terminal 915 for receiving a video signal Sv therefrom. A first video signal processor 901 is provided for processing the video signal Sv for recording to the tape 110. A first tracking signal generator 902 is provided for producing a first tracking signal St1. An adder 917 is provided for receiving the signals Sv and St1 to produces the added signal Sv+St1. A recording amplifier 903 is provided for receiving the added signal Sv+St1 and transferring the amplitude increased signal Sv+St1 to the writing head 212 for recording to the tape 110.

A recording position detection detector 913 is provided for detecting that the reading head 211 is located on the position of the tape from which the recording is started after receiving the recording instruction from a main controller 914 to produce a position detection signal Sp. A head mode controller 912 has an input port connected to the detector 913 for receiving the position detection signal Sp and produces control signals Sd and Ss. The controller 912 further has two output ports connected to a driver 911 and a select switch 910 by a line L2, respectively. The select switch 910 selects either of lines L1 and L3 in response to the control signal Ss coming through the line L2. A second tracking signal generator 920 is connected to the driver 911, and is driven by the control signal Sr to produces a second tracking signal St2, too. The second tracking signal St2 differs than the first tracking signal St1 in the frequency. A recording amplifier 921 is connected to the tracking signal generator 920 for producing and transferring the amplitude increased tracking signal St2 through a line L1.

A reproducing amplifier 906 connected to the line L3 is selectively connected to the reading head 211 by the switch 910 for receiving the playback signal reproduced from the tape 110, and produces an amplified playback signal Sv+St1 or (Sv+St2). The amplifier 906 is connected to a tracking signal detector 907 and a second video signal processor 922 in parallel for transferring the playback signal Sv+St thereto. The tracking signal detector 907 detects how the heads 211 and 212 deviate from the correct track based on the tracking signal St of the playback signal and produces a tracking compensation signal Sc. The capstan motor driver 908 is connected to the tracking signal detector 907 and a capstan motor 909 for driving the capstan motor 909 based on the compensation signal Sc to control the capstan motor (not shown) for driving the tape 110 so that the heads 211 and 212 are correctly tracked on the target track. The second video signal processor 922 processes the video signal Sv from the playback signal Sv+St2 or Sv+St1 and output through an output port 916.

It is to be noted that the construction of magnetic recording apparatus with respect to analog signals are described in the above, but it is apparently possible for the person in this field to apply the magnetic recording apparatus of FIG. 1 for dealing with the digital signals by adding some components in the signal input system and the signal output system thereof. For this purpose, a channel recorder and a memory may added between the video signal processor 901 and the adder 917. A equalizer and demodulator may be added between the reproducing amplifier 906 and the tracking signal detector 907.

With reference to FIG. 7, the recording operation of the magnetic recording apparatus of FIG. 1 is described. In FIG. 7, the tracks formed on the recording tape 110, viewed from the drum side, at the initial stage of recording operation is shown, there are two tracks Tr1 and Tr2 and two primary tracks Tr2p and Tr3p are recorded on the tape 110. The first track Tr1 and the first primary track Tr2p are formed by the first reading/writing path of the head unit 210. The second track Tr2 and second primary track Tr3p are formed by the second reading/writing path of the head unit 210'. It is to be noted that the head unit 210 including the heads 211 and 212 of the second path are indicated as 210', 211', and 212', respectively, for the sake of recognition. The second primary track Tr2p also has the second tracking signal St2 having a predetermined frequency different from that of the track Tr2. Thus, the second tracking signal generator 920 preferably outputs the second tracking signal St2 whose frequency is alternately selected from two of predetermined values every time of reading and writing path.

When the recording operation starts, the main controller 914 resets the magnetic recording apparatus itself for staring the first reading/writing path. At the initial stage of recording, the recording position detector 913 detects that the head unit 200 are located on the proper position with respect to the recording tape 110, and then outputs the position detection signal Sp. On receipt of the signal Sp, the head mode controller 912 outputs the control signals Sd and Ss to the driver 911 and the select switch 910, respectively. The driver 911 instructs the second tracking signal generator 920 to produce the second tracking signal St2 for recording to one track. The select switch 910 connects the line L1 to the line L4 so as to transmit the second tracking signal St2 to the reading head 211. Then, the reading head 211 records the second tracking signal St2 to the first track Tr1 of the tape 110. At the same time, the video signal Sv coming through the input terminal 915 is mixed with the first tracking signal St1 are recorded on the first primary track Tr2p.

Since the head unit 210 having the reading head 211 has the track width Wr as twice as wide as the track pitch TP is installed in the head drum 101A at the above described dimensional relationship precisely, the side edges Ha of the writing head 212 traces on the same line Lb which is a boundary line between the track Tr1 and the primary track Tr2p, resulting in no guard band therebetween. Thus, the first reading/writing path of the head unit 210 on the tape 110 is performed such that both the heads 211 and 212 write the tracking signal St2 and video signal with tracking signals Sv+St1, respectively on the tape 110.

Next, the second reading/writing path is performed as follows. The recording position detector 913 detects that the head unit 200 are located on the proper position for the second reading/writing path, and produces the signal Sp. On receipt of the signal Sp, the head mode controller 912 produces the control signal Ss so that the select switch 901 is turned to connect the line L4 to the line L3. Thus, the reading head 211 is part from the second tracking signal source 911, 920, and 921. During the operation of second reading/writing path, the reading head 211' is guided to trace the track Tr1 and the primary track Tr2p. Then the first primary track Tr2p is partially eliminated by the second primary track Tr3p on the bottom side portions, and the second track Tr2 having a track width defined by a distance Wo between the tracks Tr1 and Trap is formed.

It is to be noted that the relative track width C (see, FIG. 4) of the head unit 210 is so adjusted that a distance between the side edge Ha of the writing head 212 and the center line of the reading head 211 is equal to a single track pitch TP, as described previously with reference to FIG. 4. Therefore, the writing head 212 traces the correct position to form the second track Tr2 while the reading head 211 keeps the boundary line Lb under the center thereof. For this purpose, the reading head iv tracked based on the playback signals reproduced from the tracks Tr1 and Tr2 as follows.

Figure 8:
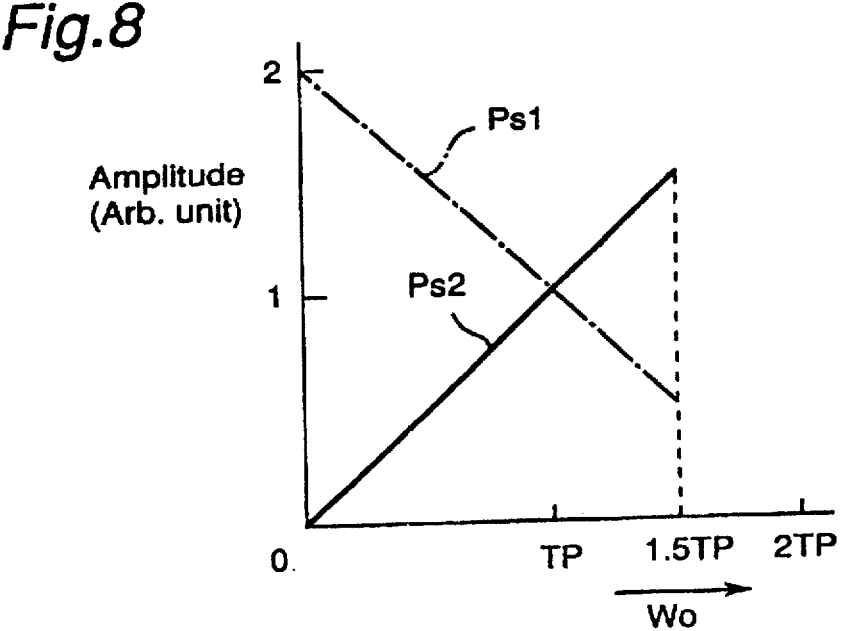
FIG. 8 is a graph showing playback signals reproduced from the tracks of FIG. 7.

Referring to FIG. 8, a graph showing the relationship between the playback signal reproduced by the reading head 211 and the track width W is shown. A phantom line Ps2 represents a playback signal from the track Tr1, and a solid line Ps2 represents a playback signal Ps2 reproduced from the tracks Tr2. Since the amplitude of the signal reproduced from the track is proportional to the area that the reading head 211' can scan. In other words, the amplitudes of playback signal Ps1 and Ps2 depend on the width of reading head 211' above the track Tr1 and the width Ww of track Tr2 after being overwritten by the primary track Tr3p.

Therefore, when the reading head 211' is located over the track Tr1 entirely meaning that the writing head 212' eliminates the primary track Tr2p, any portion of the track Tr2 is formed. As the writing head 212' parts from the track Tr1, the amplitudes of the signals Ps1 and Ps2 becomes smaller and greater, respectively. And when the writing head 212' reaches the position remote from the track Tr1 by the track pitch Tp, both the signals Ps1 and Ps2 has the same amplitude which corresponds to the track pitch Tp. Finally, the writing head 212' moves out the full width of the primary track Tr2p having the track width a half times as large as the track pitch, as shown in FIG. 8.

Figure 9:
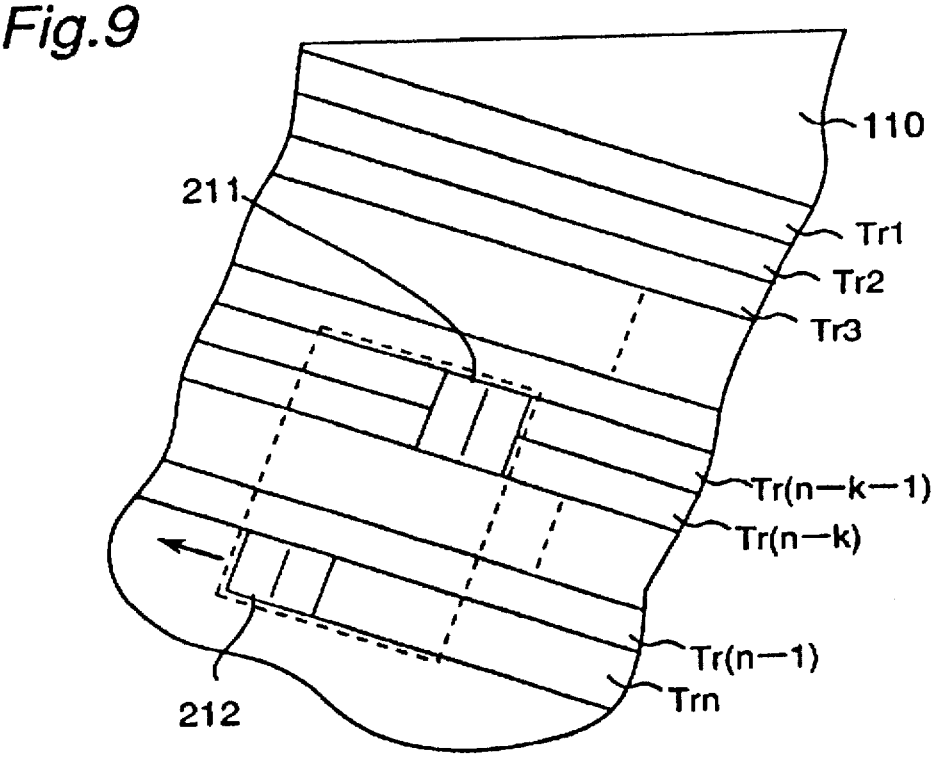
FIG. 9 is a view in assistance of explaining the tracking of writing head with respect to two tracks.
Figure 10:
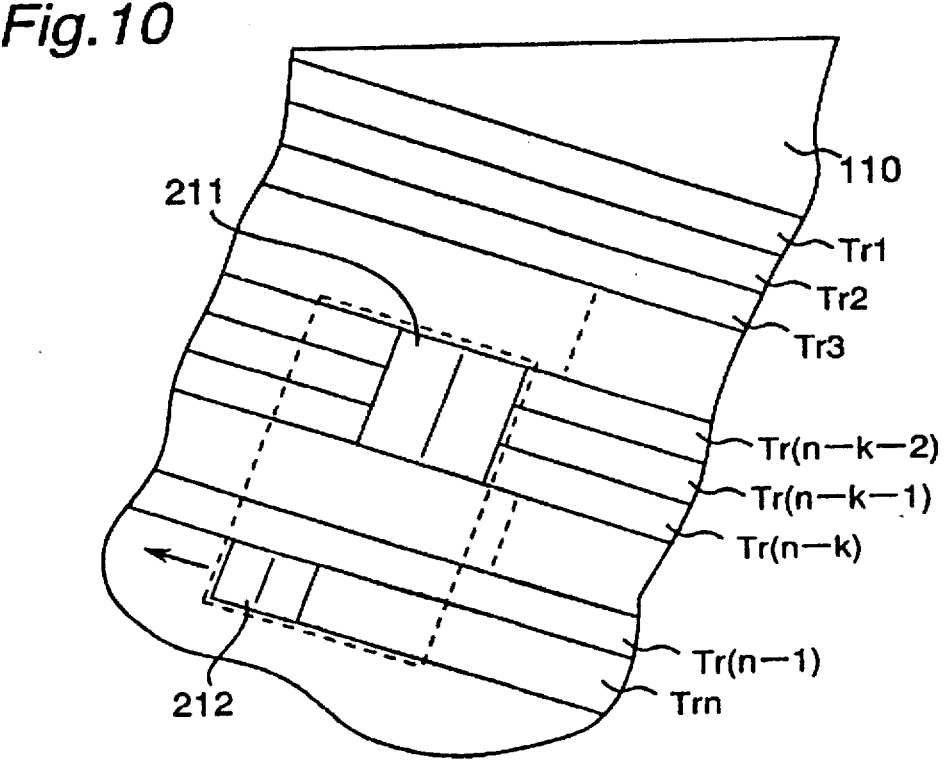
FIG. 10 is a view in assistance of explaining the tracking of the writing head with respect to three tracks.

Therefore, it is apparent that the head unit 210 can be correctly tracked on the target tracks based such that the capstan motor 909 moves the recording tape 110 to the correct position with respect to the heads 211 and 212 based on the tracking compensation signal Sc. Thus, once the first track Tr1 is formed on the tape 110, the next track (second track Tr2) having the correct track pitch Tp are automatically formed during the next reading/writing path. In this sense, the first track Tr1 is a standard track for successively forming the tracks under the correct tracking. Referring to FIGS. 9 and 10, variations of the tracking by the magnetic recording apparatus of the present invention are shown. In FIG. 9, there are plural tracks starting from Tr1 to Tr(n−1) recorded on the tape 110 by the recording apparatus of the present invention, where "n" is an integer not less than two. Each track has the same track pitch PT and tracking signal whose frequency alternately changes with respect to the successive tracks, as described previously. In this case, the head unit 210 is arranged using the spacer 108 such that the center of reading head 211 is located over the boundary line of tracks Tr(n−k) and Tr(n−k−1) when the writing head 212 records the track Trn. "k" is an integer not less than one. The relative track height C is expressed as $$C = k\ TP + Wr/2. \qquad (6).$$

The thickness Z of the spacer is expressed as $$Z = C + Y - X \qquad (7).$$

Therefore, the writing head 212 can record the track Trn with the correct track pitch Tp by tracking the head unit 210 such that the amplitudes of the tracking signals from the tracks Tr(n−k) and Tr(n−k−1) are kept the same.

In FIG. 10, the head unit 210 is tracked with respect to three tracks Tr(n−k), Tr(n−k−1), and Tr(n−k−2). In this case, the reading head 211 can be designed to have the track width Wr smaller than the twice the track Width Ww of writing head 212. Furthermore, both in the cases of FIGS. 9 and 10, the writing head 212 is tracked with respect to the tracks which were formed before more than one reading/writing path.

Second Embodiment

Figure 12:
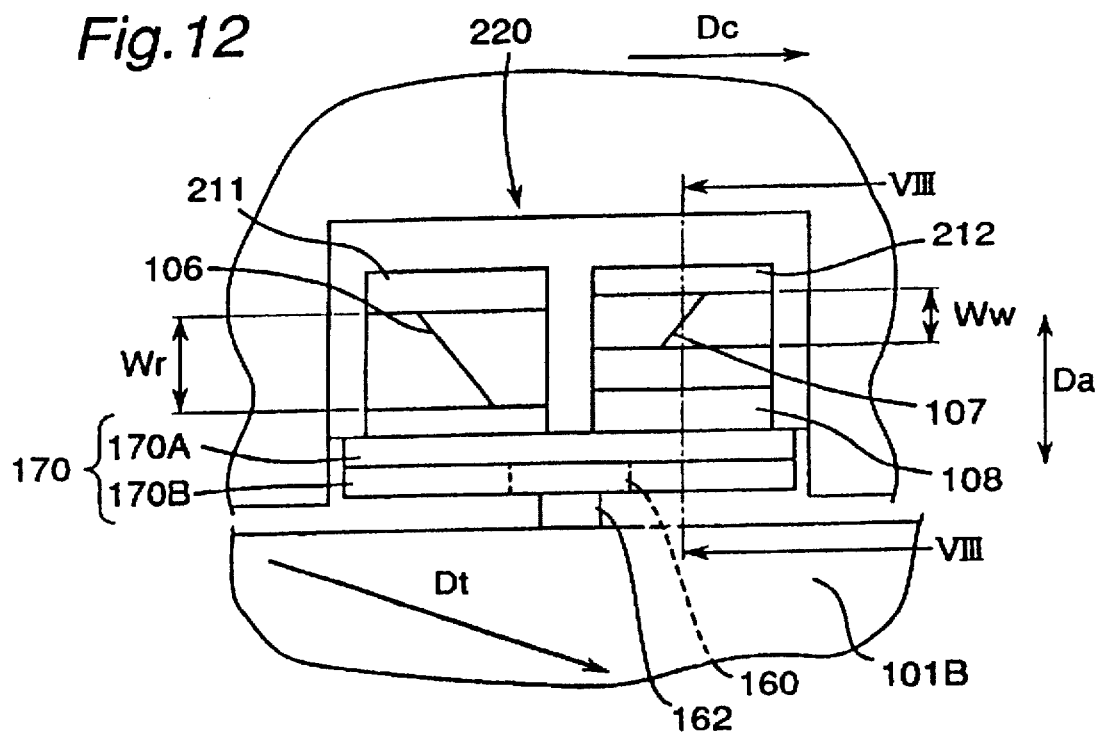
FIG. 12 is a front view showing a reading and writing unit of the magnetic recording apparatus of FIG. 11.
Figure 13:
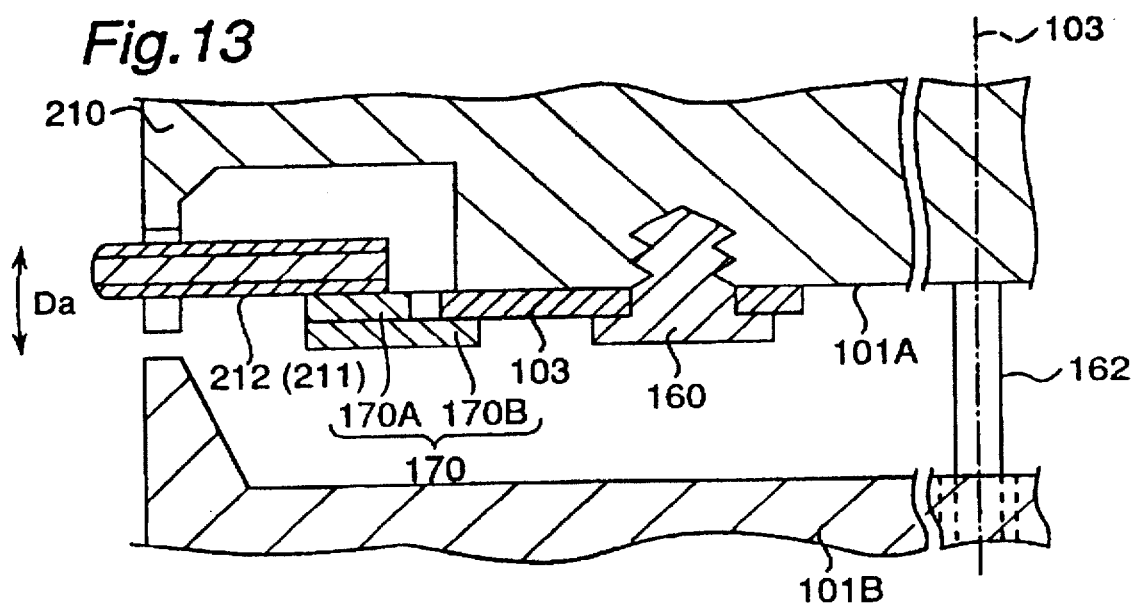
FIG. 13 is a cross-sectional view taken along a line XIII—XIII shown in FIG. 12.

Referring to FIGS. 12 and 13, a front view of a head unit 220 of a magnetic recording apparatus according to a second embodiment of the present invention is shown. The head unit 220 has the reading head 211 and the writing head 212 arranged at the same condition of the first embodiment, but further has a dynamic actuator 170 for vertically moving the head unit 220 itself in a direction indicated by an arrow Da. The dynamic actuator 170 is, for example, comprised of a bimorph having upper and lower layers 170A and 170B which are adhered to each other, and can be controlled by deformation according to the voltage applied thereto.

Figure 11:
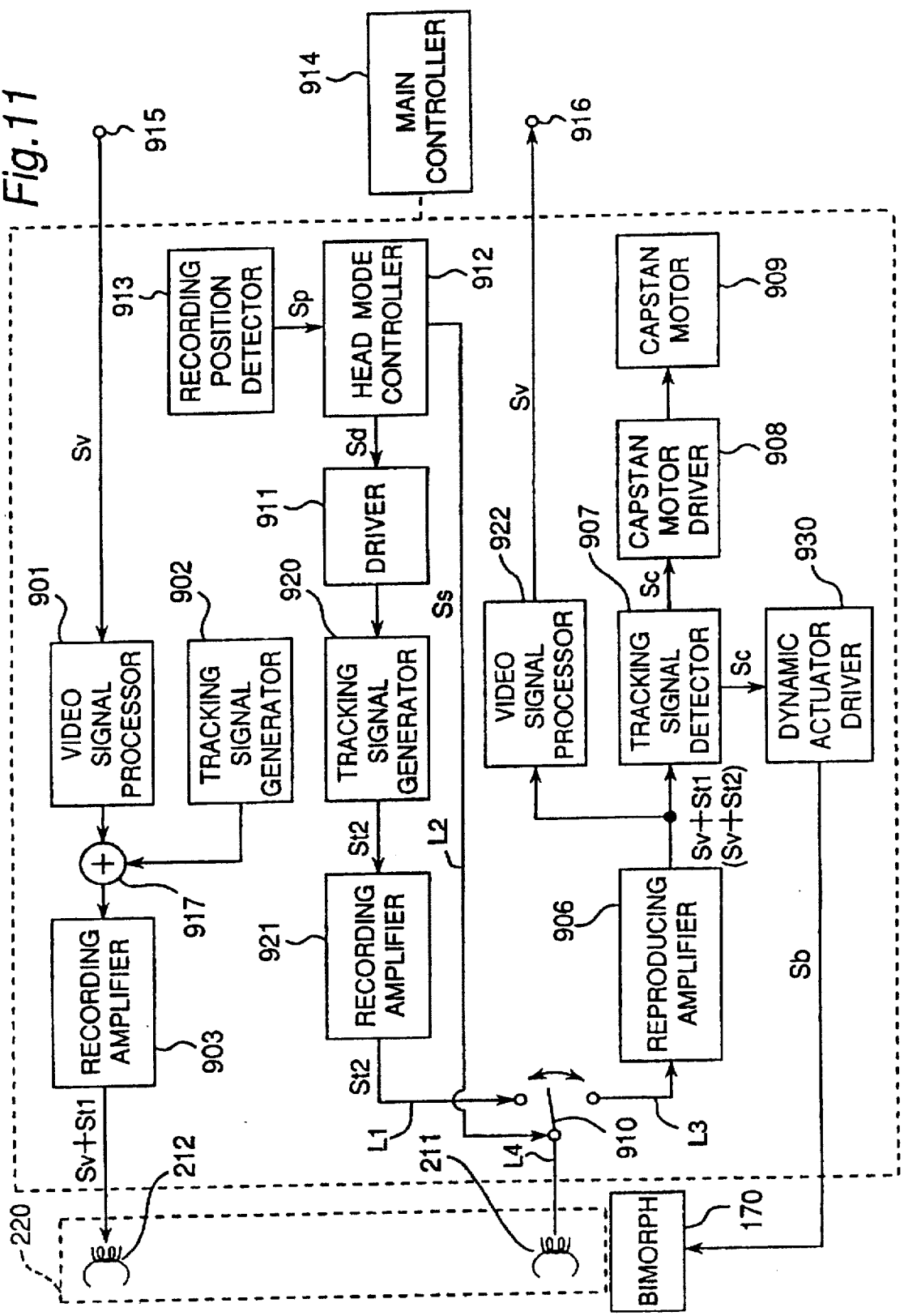
FIG. 11 is a block diagram showing a magnetic recording apparatus according to a second embodiment of the present invention.

Referring to FIG. 11, the construction of magnetic recording apparatus wherein thus arranged head unit 220 is incorporated is shown. The magnetic recording apparatus in FIG. 11 additionally includes a dynamic actuator driver 930 connected to the tracking signal detector 907 for receiving the tracking compensation signal Sc therefrom, and is connected to the bimorph 170. The dynamic actuator driver 930 produces a bimorph control signal Sb for actuating the bimorph 170 to control the position of the head unit 220 based on the signal Sc. Since the entire head unit 220 can be adjusted on the desirable vertical position by the bimorph 170, it is possible to adjust the writing head 212' to record the primary track Trap according to the recorded condition of track Tr2 shown in FIG. 7. More specifically speaking, thus constructed magnetic recording apparatus is very effective in such a case that the writing head 212 can not be placed on the correct position by the control of the capstan motor 909 when the both heads 211 and 212 scan the tape 101 at the same time, because the position of the writing head 212 can be controlled independently.

Figure 14:
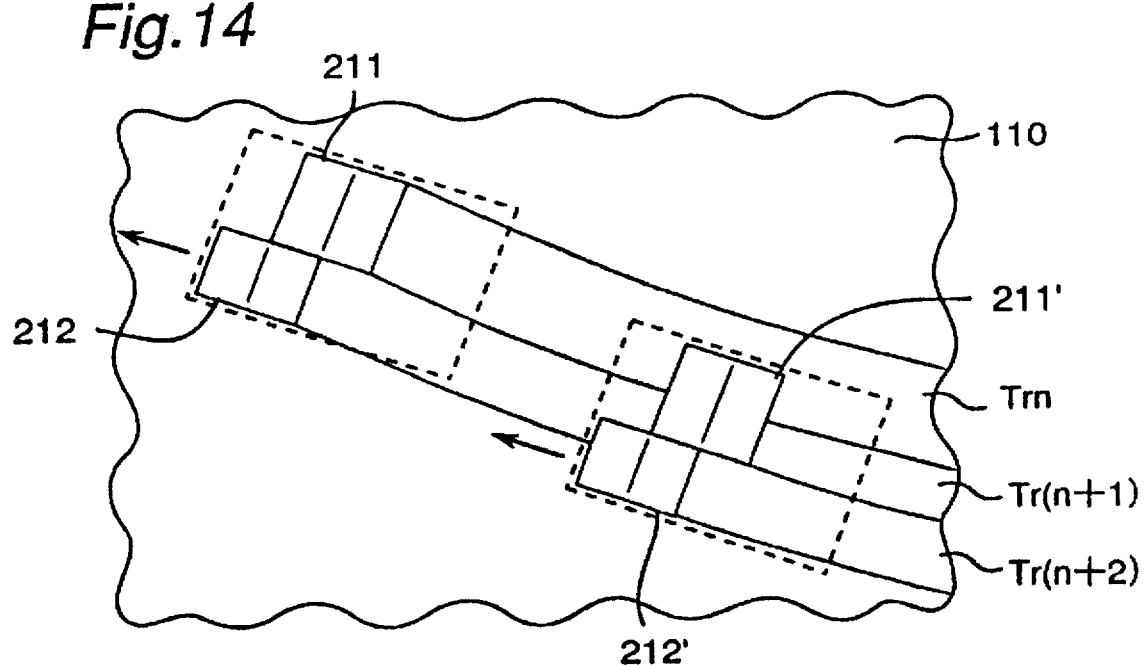
FIG. 14 is a view showing tracks magnetically recorded on the recording tape by the magnetic recording apparatus of FIG. 11.
Figure 23:
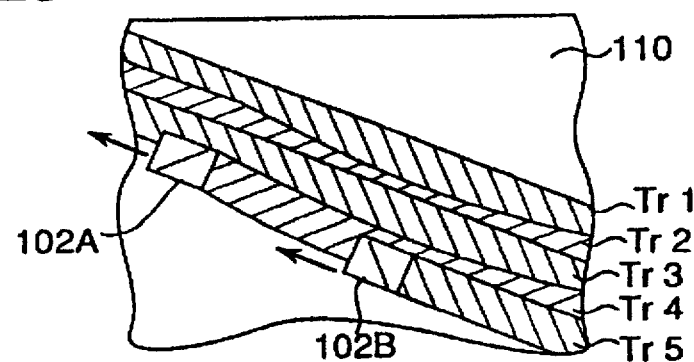
FIG. 23 is a view in assistance of explaining the track forming by Azimuth recording when the each of magnetic heads draws the different shaped trace.
Figure 24:
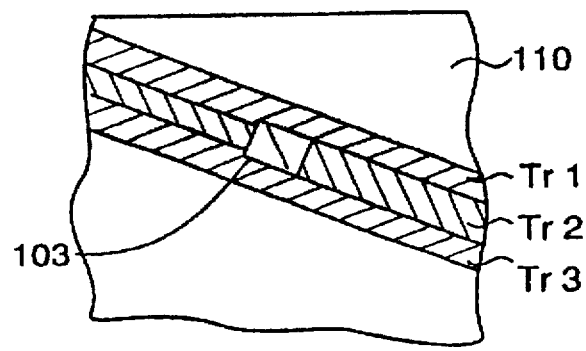
FIG. 24 is a view in assistance of explaining the insertion recording by Azimuth recording.

With reference to FIG. 14, the operation of magnetic recording apparatus used in the recording tape wherein the track(s) is already recorded by the conventional magnetic recording apparatus. For example, the tracks are recorded incorrectly as shown in FIG. 23, where a trace Trn is curved and the track width will be reduced due to the superimposition of the curved tracks. However, according to this embodiment, the writing head 212' is always positioned correctly for recording the track Tr(n+2) such that the reading head 211' can be located over the boundary line between the tracks Trn and Tr(n+1) even the boundary is curved, as shown in FIG. 14.

Third Embodiment

Figure 16:
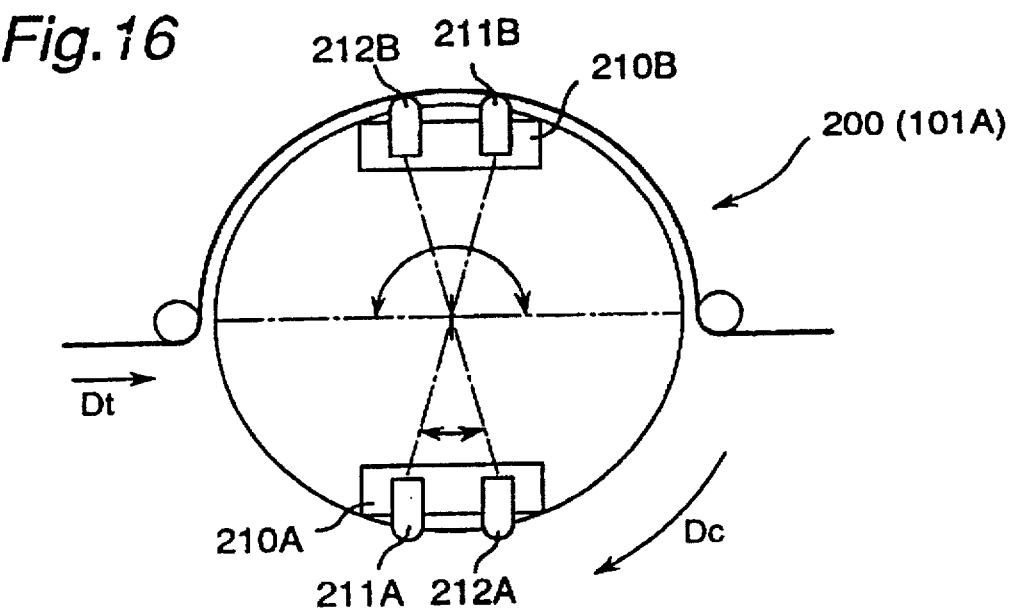
FIG. 16 is a top view showing a rotating head drum of a magnetic recording apparatus of FIG. 15.
Figure 17:
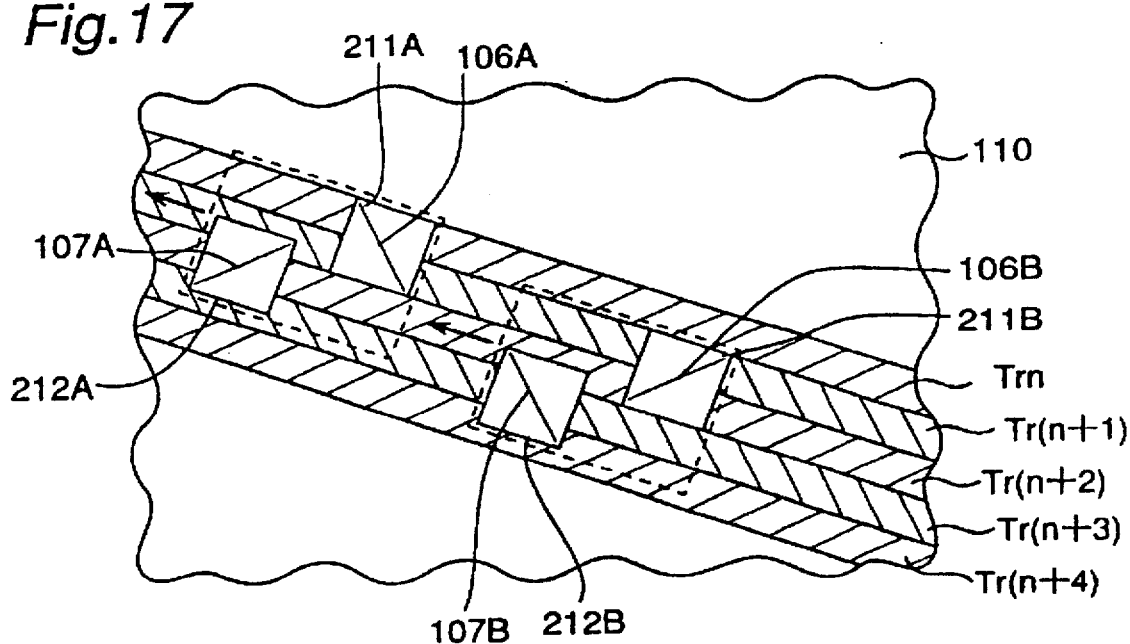
FIG. 17 is a view showing the tracks magnetically recorded on the recording tape by the magnetic recording apparatus of FIG. 15.

Referring to FIG. 16, a top view of the head drum unit 200 incorporated in a magnetic recording apparatus according to a third embodiment of the present invention is shown. The head drum unit 200 has a first and second head units 210A and 210B which are located on the opposite position is rotated. The first head unit 210A has a first writing head 212A and a first reading head 211A. The second head unit 210B also has a second writing head 212B and a second reading head 212A. The reading heads 211A and 211B and writing heads 212A and 212B are arranged on the same conditions of the heads 211 and 212, respectively.

Figure 15:
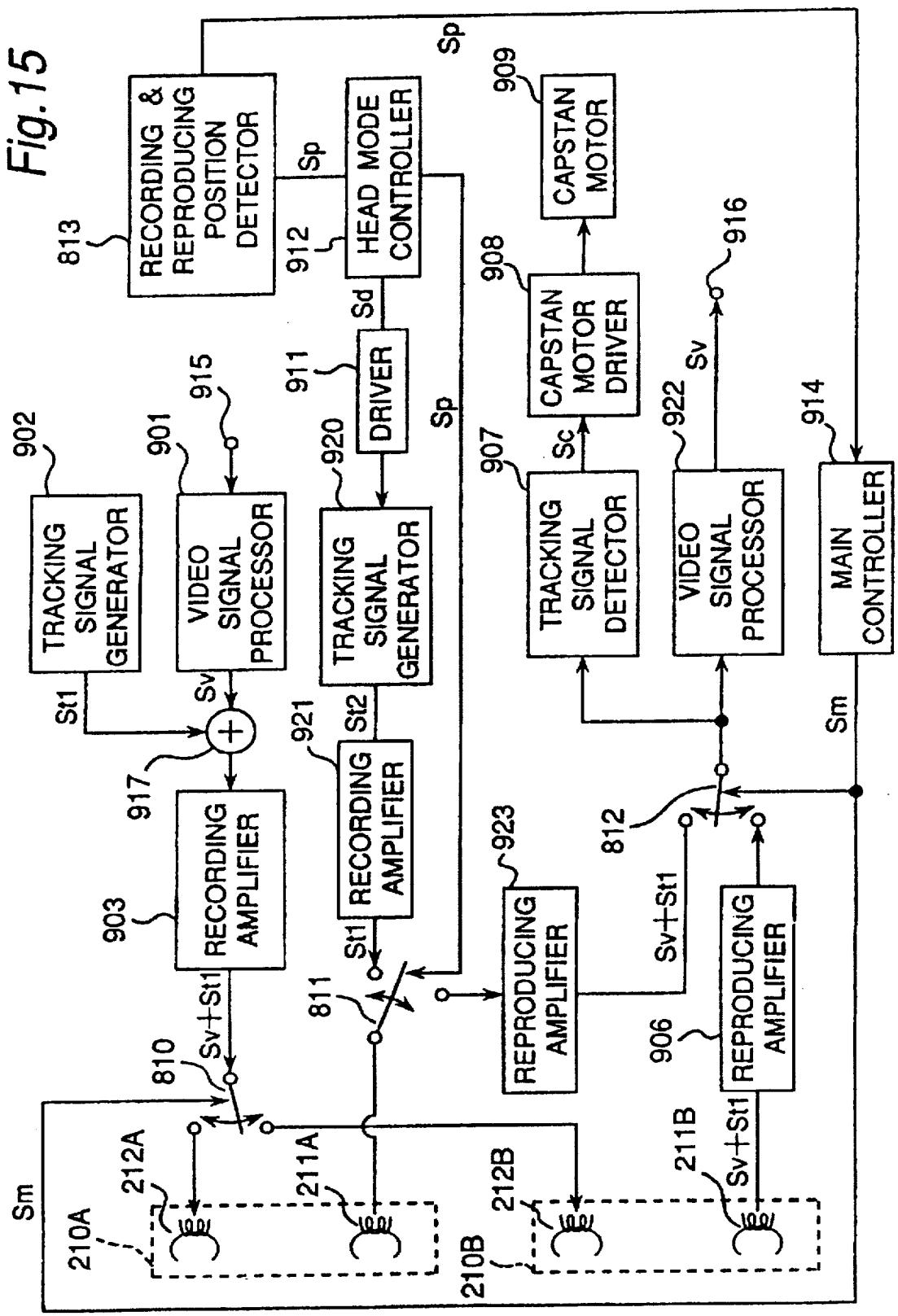
FIG. 15 is a block diagram of the magnetic recording apparatus according to a third embodiment of the present invention.

Referring to FIG. 15, the construction, similar to that shown in FIG. 1, of the magnetic recording apparatus of this embodiment is shown. The head unit 210, the recording position detector 913, in FIG. 1 are replaced by the first and second head units 210A and 210B and a recording and reproducing position detector 813. Furthermore, the switches 910 in FIG. 1 is removed, and switches 810, 811, and 812 and a second reproducing amplifier 923 are added. The first switch 810 selectively connects the output of first recording amplifier 903 either one of the first writing head 212A and the second writing head 212B in response to a switch control signal Sm produced by the main controller 914. The second switch 811 selectively connects the output of second recording amplifier 921 to either one of the first reading head 211A and the input of the second reproducing amplifier 923 in response to the control signal Ss produced by the head mode controller 912. The third switch 812 selectively connects either one of the outputs of reproducing amplifiers 923 and 906 to the tracking signal detector 907 and video signal processor 922. The recording and reproducing position detector 813 is connected to the main controller 914 and the main controller 914. The detector 907 detects that the head units 210A and 210B are located on the proper position for the reading/writing path, and produces the position detection signal Sp. It is to be noted that the signal Sp is produced twice while the upper head drum 101A makes on rotation.

Figure 20:
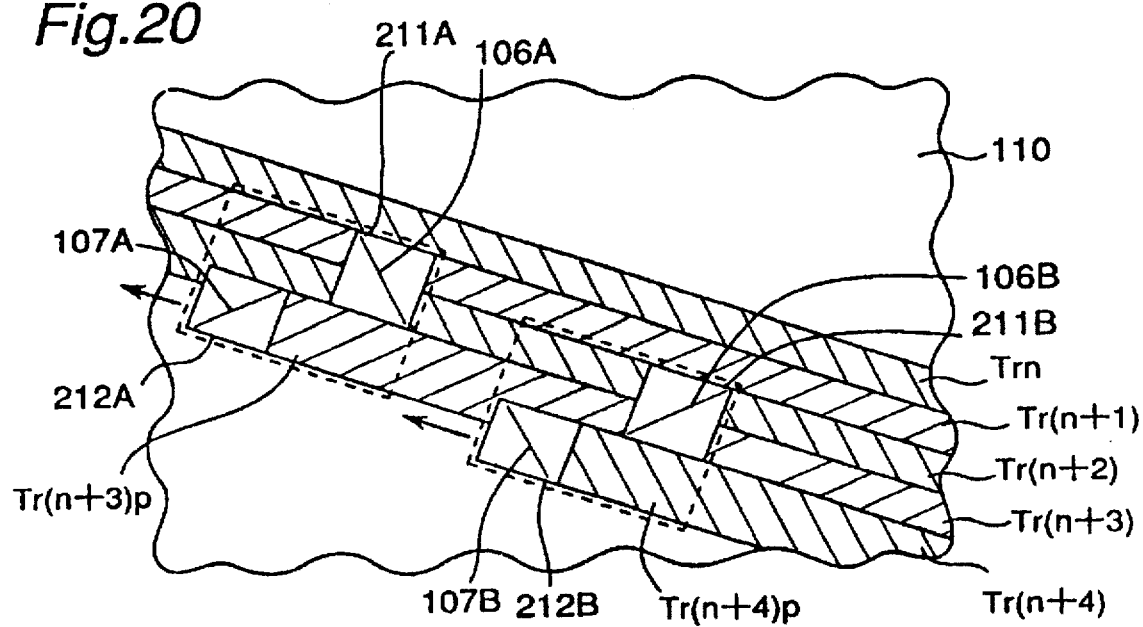
FIG. 20 is a view showing the tracks magnetically recorded on the recording tape by the magnetic recording apparatus of FIG. 18.
Figure 19:
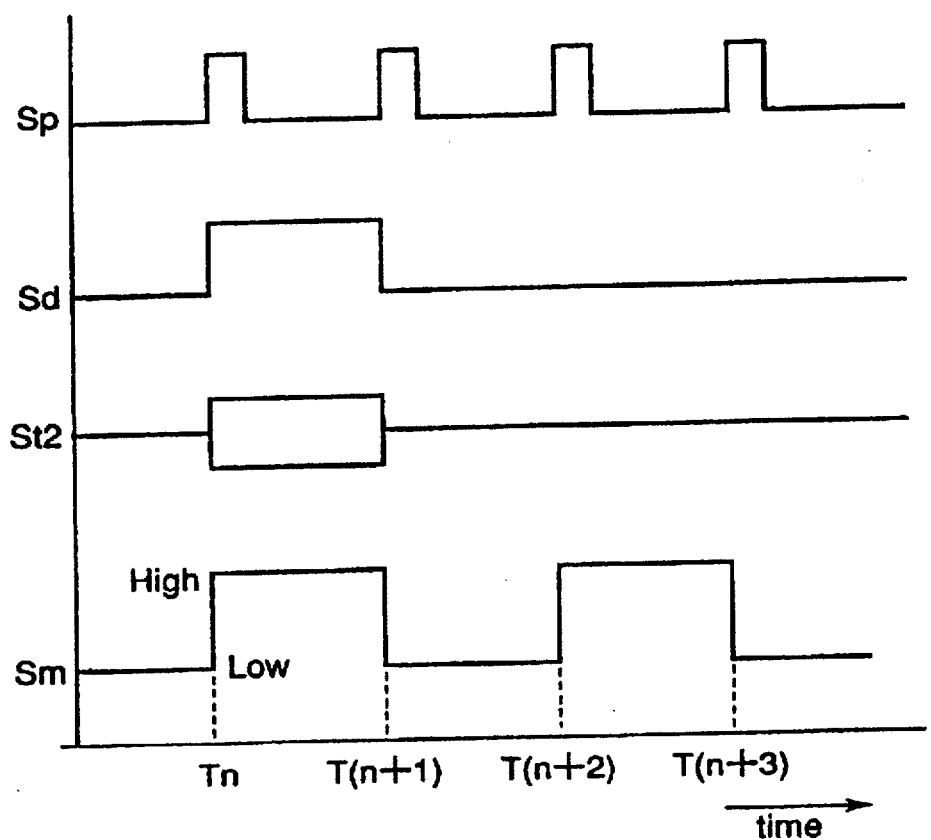
FIG. 19 is a graph in assistance of explaining the operation of the magnetic recording apparatus of FIG. 18.
Figure 21:
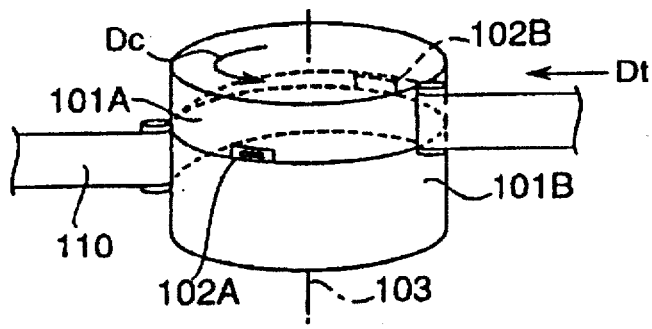
FIG. 21 is a perspective view showing a rotating head drum of a conventional magnetic recording apparatus.
Figure 22:
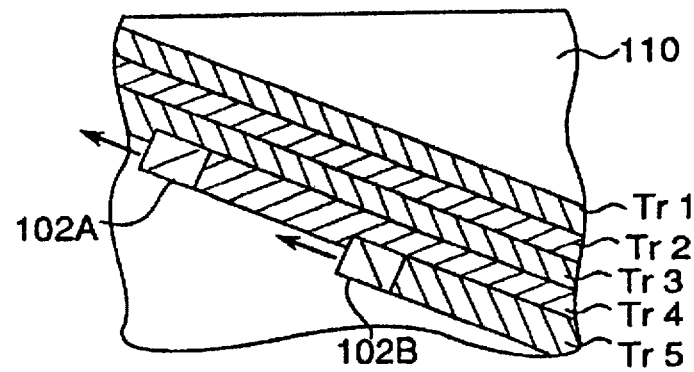
FIG. 22 is a view in assistance of explaining the tracks formed by Azimuth recording.

With reference to FIGS. 19 and 20, the Azimuth recording/reproducing by the magnetic recording apparatus of this embodiment is described. It is to be noted that the azimuth angle of the magnetic gaps 107A and 106B are the same as those in the tracks Trn, Tr(n+2), and Tr(n+4), and the azimuth angle of the magnetic gaps 106A and 107B are the same as those in the tracks Tr(n+1) and Tr(n+3). In this embodiment, the first track Trn is recorded in the same manner as in the first embodiment, and now a track Tr(n+1) is under the writing operation.

At the beginning of the (n+3)th writing path, the recording and reproducing detector 813 transmits the signal Sp to the mode controller 912 and the main controller 914. On receipt the signal Sp, the main controller transmits the switch control signal Sm to the first and third switches 810 and 812, respectively. After second reading/writing path, and the head mode controller 912 does not transmit the control signal Ss to the second switch 811. Thus, the first head unit 210A records on the track Tr(n+3) and reproduces from the track Tr(n+1) simultaneously.

Then, the first switches 810 connects the first recording amplifier 903 to the first writing head 212A for recording the video signal Sv+St1 to the primary track Tr(n+3)p in response to the signal Sm. The second switch 811 is kept to connect the first reading head 211A to the second reproducing amplifier 921 for transmitting the playback video signal Sv+St1 reproduced from the track Tr(n+2), to the reproducing amplifier 923. The third switch 812 connects the tracking signal detector 907 and video signal processor 929 to the reproducing amplifier 923 for receiving the amplified signal Sv+St1.

Next, the (n+4)th reading/writing path begins. The position detection signal Sp is produced, and the switches 810 and 811 are operated to the other side contrary to those connected at the (n+3)th path. Then, the first recording amplifier 903 is connected to the second writing head 212B, and the tracking signal detector 907 and video signal processor 929 are connected to the reproducing amplifier 906 for receiving the amplified signal Sv+ST1 from the second reading head 211B. Thus, the two head units 210A and 210B are alternately used for recording and reproducing on and from the tape 110 every a half rotation of head drum 101A. The signals Sp, Sd, St2, and Sm at times tn, t(n+1), t(n+2), and t(n+3) are shown in FIG. 19, where times tn to t(n+3) correspond the beginning time of the nth to (n+3)th reading/writing path, respectively.

Fourth Embodiment

Figure 18:
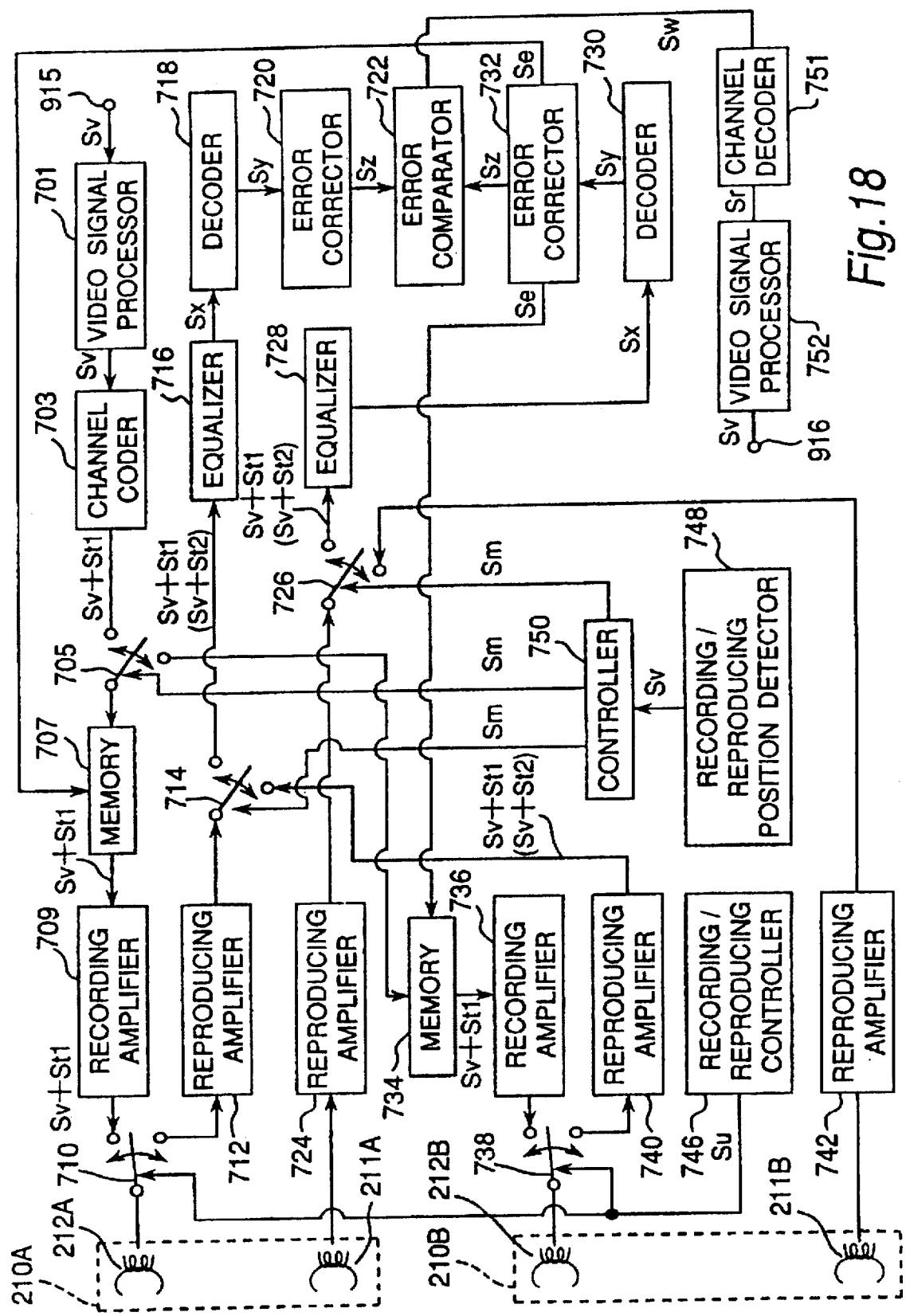
FIG. 18 is a block diagram of the magnetic recording apparatus according to a fourth embodiment of the present invention.

Referring to FIG. 18, a magnetic recording apparatus used for digital recording/reproducing according to a fourth embodiment of the present invention is shown, wherein the same head units 210A and 210B as that of the third embodiment is incorporated. The magnetic recording apparatus includes the input terminal 915 for receiving the video signal Sv therefrom. A video signal processor 901 is connected to the input terminal 915 for processing the video signal Sv for recording. A channel coder 703 is connected to the video signal processor 701 for producing the video signal Sv with the tracking signal St.

A switch 705 selectively connects either one of the channel coder 703 and a memory 734 capable to store the data for two tracks to a recording amplifier 709 in response a control signal sm from a controller 750. A switch 710 selectively connects either one of the recording amplifier 709 and a reproducing amplifier 713 to the first writing head 212A in response to a signal Su from a recording/ reproducing controller 746.

A switch 714 selectively connect the reproducing amplifier 712 to either one of an equalizer 716 and a reproducing amplifier 740 in response to the control signal Sm from the controller 750. A decoder 718 receives a equalized signal Sx from the equalizer 728 to a decoder 718. An error corrector 720 is connected to the decoder 718 and produces a error correction signal Sz based on the signal Sx.

A first reading head 211A is connected to a reproducing amplifier 724. A switch 726 selectively connects either one of an equalizer 728 and a reproducing amplifier 742 in response to the control signal Sm from the controller 750 which is connected to a recording and reproducing position detector 748. A decoder 730 is connected to the equalizer 728 and produces the signal Sy. An error corrector 732 is connected to the decoder 730 for receiving the signal sy to produce signals Sz and Se. The error corrector 732 is connected to the error comparator 722 for transmitting the signal sz thereto, and is connected to the memory 743 for transmitting the signal Se.

On receipt of the signals Sz from the error correctors 720 and 732, the error comparator 722 produces the signal Sw. A channel decoder 751 is connected to the error comparator 722 and produces the signal Sr based on the signal Sw. A video signal processor 752 is connected to the channel decoder 751 and outputs the video signal Sv through an output terminal 916.

A recording amplifier 736 is connected to the memory 734 for receiving the video signal Sv with the tracking signal St1. A switch 738 selectively connects either one of the recording amplifier 736 and a reproducing amplifier 740 to the second writing head 212B. The second writing head 211B is connected to the reproducing amplifier 742.

In operation, the video signal processor 701 processes the video signal Sv for the recording and input the processed signal to the channel coder 703. The channel coder 730 divides the signal into a plurality of blocks and adds a synchronization signal to the top of each blocks. The channel coder 730 further encodes according to a predetermined encoding table to produce a tracking signal St. Thus produced tracking signal St is input to the memory 704 which stores the data for one track. This encoded data for one truck has an area for re-recording therein. The memory 707 has the capacity for the data of two tracks, and stores the data recorded to the previous track and the data is about to record to the track.

The data for one track from the memory 707 is transferred to the recording amplifier 709 which will be recorded to the tape 110 by the first recording head 712A. The playback signal reproduced by the reading head 211A installed on the same support plate 130 is amplified by the reproducing amplifier 712, is treated by the equalizer 716, and is then decoded by the decoder 718. The error included in the signal decoded by the decoder 730 is corrected.

According to this embodiment, the data is recorded to the tape 110 by the writing head as well as the reading head which are fixed on the same support plate, and the data is decoded. The reading head reproduces the data recorded just before the writing head, now being under writing. The data reproduced by the reading head 221A is the same as that the data recorded to the previous track. When thus reproduced data has an error which can not be corrected by the error corrector 732, the number of blocks having such recoverable error is transmitted to the memory 734. The memory 734 transmits the block number data out of the data stored in the re-recording block provided in the data now recording. The writing head 212B records the data subject to this modified data to the next block. As a result, the data in the block having an error correction error is recorded to the different track. The operation described above will be repeated with respect to each of all tracks successively.

Since the re-recording area is limited, it is theoretically possible that this embodiment does function effectively when a lot of errors occur. However, actually only some error occur in a track, and it is enough to prepare the re-recording area for some number of errors. Furthermore, the probability of error correction errors due to the drop out caused by the defect in the tape can be suppressed, because the these error data are recorded to the different tracks of the tape. Thus recorded signal is reproduced by the recording head, and it is to be noted that the error correction error detected are removed as described above, the data will be reproduced correctly with a greater probability, resulting in reduction of the errors.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recording apparatus for magnetically recording a signal on a recording tape comprising:

first tracking signal generating means for generating a first signal having a first predetermined frequency;

first head means for writing said first signal on said recording tape to form a first track;

second tracking signal generating means for generating a second signal having a second predetermined frequency, said second signal being mixed with a video signal to form a mixed signal;

second head means for writing said mixed signal on said recording tape to form a second track, said mixed signal forming an entirety of said second track; and tracking means for tracking said first head means over said first and second tracks, said first head means reproducing said first and second signals such that said first and second signals have the same amplitude.

2. A magnetic recording apparatus, as claimed in claim 1, wherein said first and second head means are positioned on a base such that said second head means is located on the upper stream side than said first head means with respect to the writing direction thereof.

3. A magnetic recording apparatus, as claimed in claim 2, wherein said first and second head means have first and second predetermined widths, said second head means being located over said second track on the position remote from the said first track by a predetermined track pitch.

4. A magnetic recording apparatus, as claimed in claim 1, wherein said base is comprised of a vertical actuating means, said vertical actuating means being movable in a direction perpendicular to the longitudinal direction of said tracks according to said reproduced first and second signals.

* * * * *

UNITED STATES PATENT AND TRADEMARK OFFICE
CERTIFICATE OF CORRECTION

PATENT NO. : 5,739,973
DATED : April 14, 1998
INVENTOR(S) : N. ECHIGO

It is certified that error appears in the above-identified patent and that said Letters Patent is hereby corrected as shown below:

On the title page, item [30]

Priority Data, line 2, change "May 10, 1993" to ---October 5, 1993---.

Signed and Sealed this

Fifteenth Day of September, 1998

Attest:

BRUCE LEHMAN

*Attesting Officer*  *Commissioner of Patents and Trademarks*